United States Patent
Cui et al.

(10) Patent No.: US 9,068,634 B2
(45) Date of Patent: Jun. 30, 2015

(54) RADIALLY ENGAGING SYSTEM

(71) Applicants: Kan Cui, Mercer Island, WA (US); Margaret C. Liu, Mercer Island, WA (US); Samuel K. Liu, Mercer Island, WA (US)

(72) Inventors: Kan Cui, Mercer Island, WA (US); Margaret C. Liu, Mercer Island, WA (US); Samuel K. Liu, Mercer Island, WA (US)

( * ) Notice: Subject to any disclaimer, the term of this patent is extended or adjusted under 35 U.S.C. 154(b) by 51 days.

(21) Appl. No.: 14/073,589

(22) Filed: Nov. 6, 2013

(65) Prior Publication Data

US 2015/0122059 A1    May 7, 2015

(51) Int. Cl.
*F16H 21/50* (2006.01)
*F16H 25/14* (2006.01)

(52) U.S. Cl.
CPC ..................................... *F16H 25/14* (2013.01)

(58) Field of Classification Search
CPC . F16H 25/186; F16H 2059/081; F16H 27/02; F16H 53/02; F16H 37/16; F16K 5/162; F01B 1/0668; B23B 47/34; B23B 31/1207; B25D 16/00; B25D 17/084; B25J 15/028; B25J 15/106; H02K 15/085; E21B 1/02; Y10T 74/18024; Y10T 74/18032; Y10T 74/1804; Y10T 74/18048; Y10T 74/18296; Y10T 74/1494

USPC ............ 74/22 R, 22 A, 23, 24, 48, 55, 813 L, 74/567; 279/2.2, 2.19, 17, 135, 146; 294/93, 94

See application file for complete search history.

(56) References Cited

U.S. PATENT DOCUMENTS

| | | | |
|---|---|---|---|
| 488,960 A | 12/1892 | Brintnall | |
| 3,158,017 A | 11/1964 | Guze, Jr. | |
| 4,233,913 A | 11/1980 | Herrmann | |
| 4,342,207 A | 8/1982 | Holmes et al. | |
| 4,493,199 A * | 1/1985 | Uyeda | 70/333 R |
| 4,902,165 A * | 2/1990 | Embree | 404/25 |
| 4,964,755 A * | 10/1990 | Lewis et al. | 404/25 |
| 7,153,074 B2 | 12/2006 | Wei | |
| 8,123,428 B2 * | 2/2012 | Wareham | 403/109.3 |
| 2006/0024148 A1 | 2/2006 | Wei | |
| 2013/0019703 A1 * | 1/2013 | Corcoran | 74/55 |
| 2014/0083217 A1 * | 3/2014 | Liu et al. | 74/44 |

* cited by examiner

*Primary Examiner* — William Kelleher
*Assistant Examiner* — Jude Agendia
(74) *Attorney, Agent, or Firm* — Richard C. Litman

(57) ABSTRACT

The radially engaging systems includes a housing having at least one guide channel formed therein. At least one sliding member is slidably received in the guide channel to selectively extend or retract therein in order to connect and lock mechanical components together. Each sliding member is provided with an elongate follower. A rotator is operatively mounted to the housing. The rotator includes at least one guide curve based upon an Archimedian spiral. The follower rides inside the guide curve. Selective rotation of the rotator converts the rotation into linear movement of the connected sliding member. Conversely, selective linear movement of the sliding member converts the same into rotation of the rotator.

4 Claims, 11 Drawing Sheets

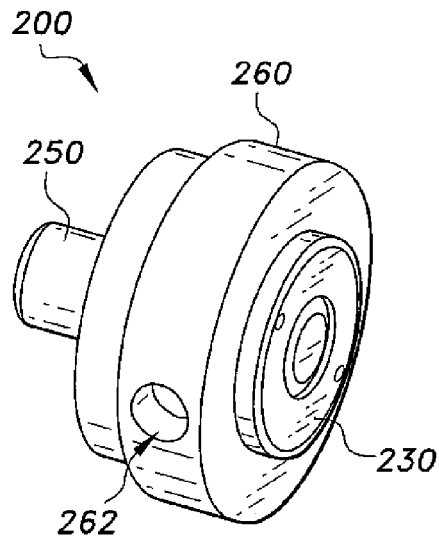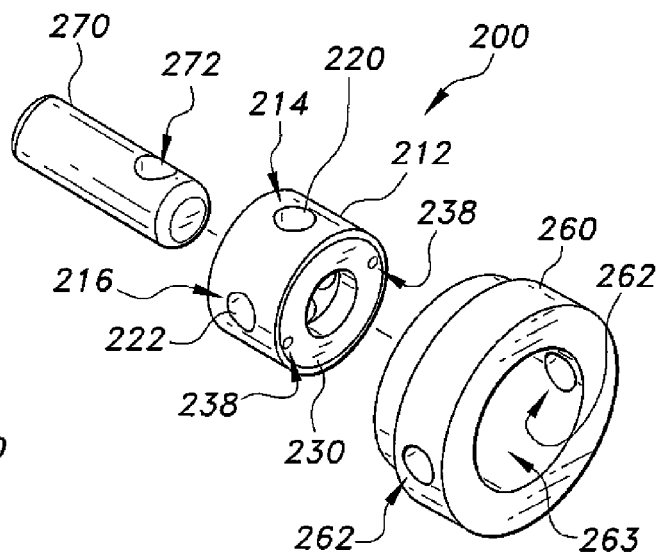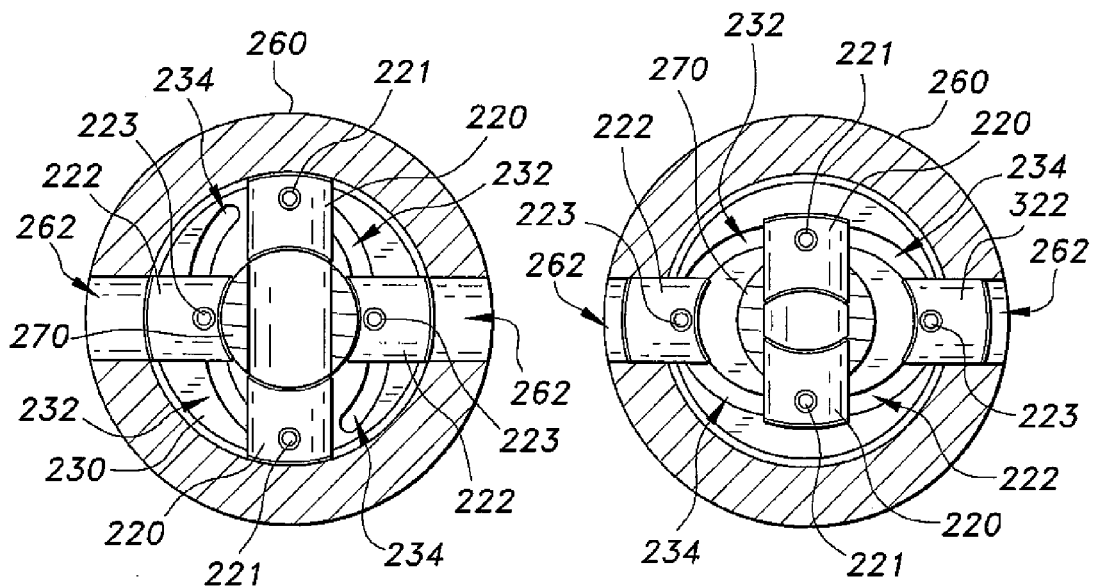

RADIALLY ENGAGING SYSTEM

BACKGROUND OF THE INVENTION

1. Field of the Invention

The present invention relates to mechanical connectors, and particularly to various embodiments of a radially engaging system that utilize Archimedean spiral curves to facilitate selective extension and retraction of members and establish a positive connection thereby.

2. Description of the Related Art

In the myriad field of mechanical devices, many systems and sub-systems exist that facilitate extension or retraction of a connected member. Some of these types of devices include linear actuators, crank mechanisms, multiple linkage systems and the like. Some are powered, while others are manually operated. The complexity of these types of devices also varies widely, depending on the particular use and environment.

While many such systems exist, not many appear to have universal application that can convert rotation to linear motion and/or vice versa in an easy and efficient manner in the context of effort and operation, especially for connecting mechanical members together. One simplest example of this type of device is a screw fastener. Rotation of the screw head translates to linear movement of the screw via engaged threads, or by the thread on the screw biting into the structure being fastened thereby. While screw fasteners are generally ubiquitous in many different mechanical applications, they are not very easy to thread or unthread without the use of specialized tools, such as a screwdriver. At times, the screw fastener can jam, requiring much more than normal effort in using the fastener.

Another example includes mechanical locks, which often contain reciprocating members moved by a rotating mechanism, such as a rack and pinion system, crank system, and the like. The simplest locks usually do not require much effort to operate, but issues can arise from potential misuse of the keys or tool used to operate the lock, misalignment of components, or mechanical failure of components. More complex locks tend to increase such potential issues, and they are generally for specific use, e.g., vault locks.

Thus, a radially engaging system solving the aforementioned problems is desired.

SUMMARY OF THE INVENTION

The radially engaging system includes a housing having at least one guide channel formed thereon. At least one sliding member is slidably received in the guide channel to selectively extend or retract therein in order to connect and lock mechanical components together. The sliding member is provided with an elongate follower. A rotator is operatively mounted to the housing. The rotator includes at least one guide curve based upon an Archimedian spiral. The follower rides inside the guide curve. Selective rotation of the rotator converts the rotation into linear movement of the connected sliding member. Conversely, selective linear movement of the sliding member is converted into rotation of the rotator.

These and other features of the present invention will become readily apparent upon further review of the following specification and drawings.

BRIEF DESCRIPTION OF THE DRAWINGS

FIG. 3A is a perspective view of still another embodiment of a radially engaging system according to the present invention.

FIG. 3B is an exploded perspective view of the radially engaging system of FIG. 3A FIG. 3C is an elevation view in section of the radially engaging system of FIG. 3A, in which a pair of sliding members engage an inner wall of an inner housing.

FIG. 3D is another elevation view in section of the radially engaging system of FIG. 3A, in which another pair of sliding members engage holes in an outer housing.

Similar reference characters denote corresponding features consistently throughout the attached drawings.

DETAILED DESCRIPTION OF THE PREFERRED EMBODIMENTS

Figure 8A:
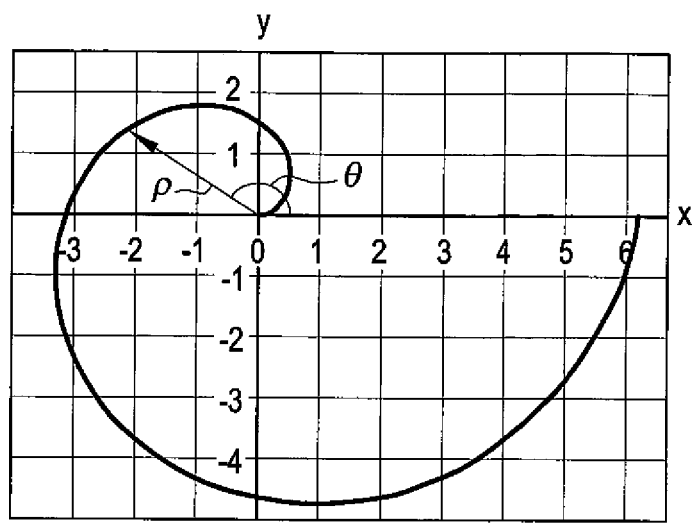
FIG. 8A is a graph of an Archimedean spiral.

The embodiments of a radially engaging system described herein provide various interlock devices utilizing Archimedean spiral configurations to facilitate selective extension and retraction of members to connect mechanical components or to facilitate selective extension and retraction of members to a mechanical component in a substantially effortless manner and with ease of operation. As best seen in the graph shown FIG. 8A, an Archimedean spiral is characterized by the mathematical formula:

$$\rho = a\theta$$

In the above formula, $\rho$ equals the radius or radial vector from the point of origin O, a equals a constant, and $\theta$ is the angle expressed in radians in polar coordinates. For any given constant a, there is a constant proportional relationship between the change in radial length and the change in angle. In other words, any arbitrary point following the above formula will change in radial length at the same proportional constant rate as that of the angular rotation.

Figure 8B:
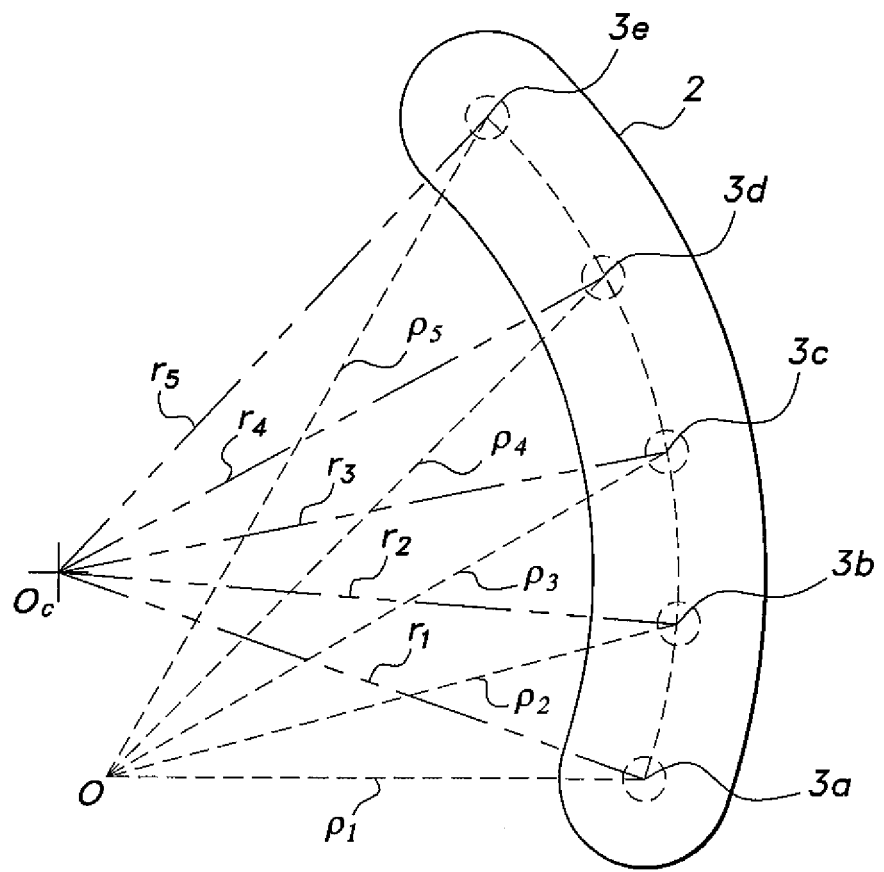
FIG. 8B is a diagram illustrating construction of a guide curve for a radially engaging system according to the present invention based upon the principals of an Archimedean spiral.

FIG. 8B shows an example of a curve 2 constructed with the principles of the above formula, the curve 2 defining the linear movement of a member, which will be further described in relation to the various embodiments described herein. In this example, it is desired to move a member a certain linear distance starting from an arbitrary initial point 3a to an end point 3e within a desired arc range, the desired linear movement in this example being 20 mm with an initial radius $\rho_1$ of 50 mm within a 60° arc. The difference between the length of the initial radius $\rho_1$ and the length of the end radius $\rho_5$ equals the length of desired linear movement. The intermediate points 3b, 3c, 3d and the intermediate radial lengths $\rho2, \rho3, \rho4$ can be determined by dividing the arc range into equal increments, e.g., 15° intervals. Joining these points 3a, 3b, 3c, 3d, 3e provides a good approximation of the shape of the desired curve 2. Increasing the increments will result in a more accurate curve 2.

Additionally, the above curve 2 can also be approximated by a simple circular curve. As shown in FIG. 8B, the curve 2 can have the properties of a simple circular curve where the axis or point of origin $O_C$ is offset from the original point of origin O. The radii $r_1, r_2, r_3, r_4, r_5$ to each respective point 3a, 3b, 3c, 3d, 3e on the curve from the offset point of origin $O_C$ are approximately equal to each other. This results in an approximate circular curve 2 that spans approximately 65.6° arc, where the average radius in the above example is about 57.6 mm. Thus, it can be seen that an Archimedian spiral can also be expressed by a circular curve.

Figure 1A:
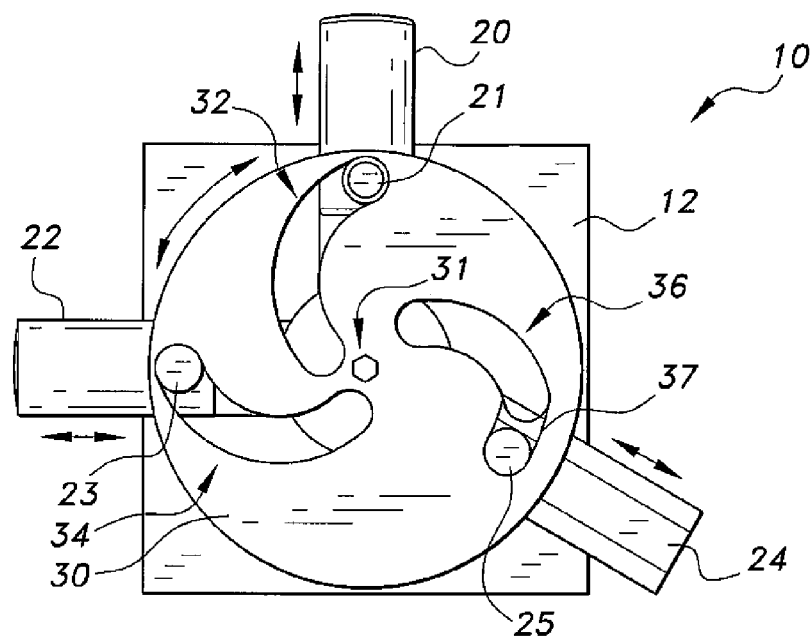
FIG. 1A is a plan view of a radially engaging system according to the present invention.
Figure 1B:
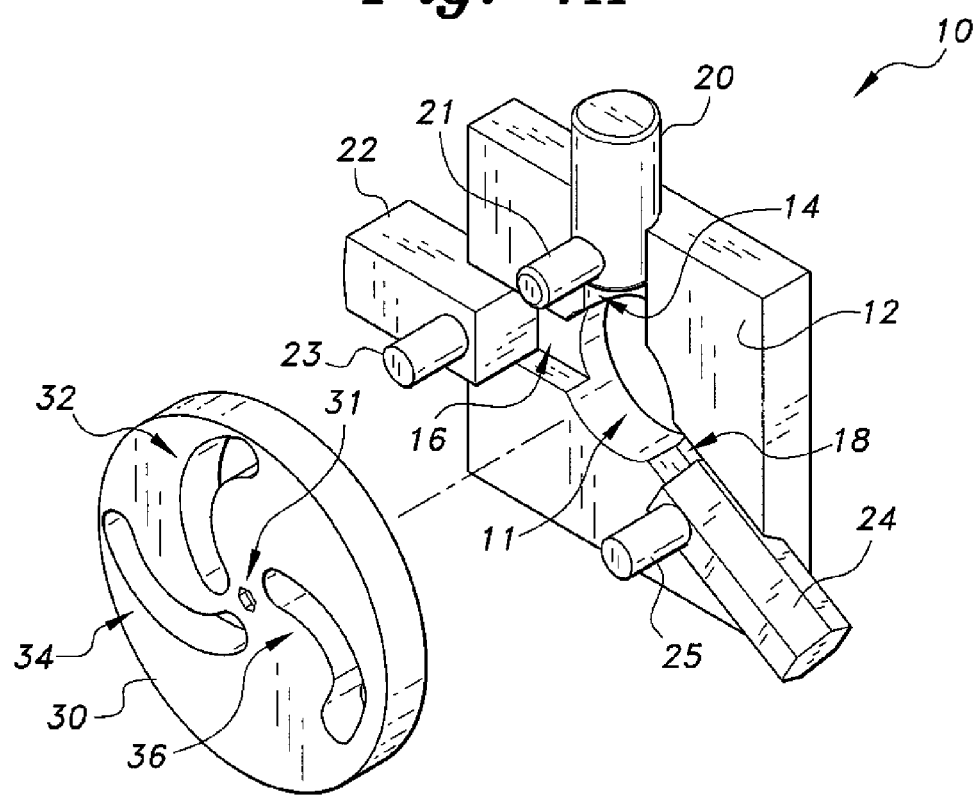
FIG. 1B is an exploded perspective view of the radially engaging system of FIG. 1A.

Using the above concepts, it has been found that a relatively smooth and effortless translational curve can be constructed, especially for radially engaging systems, to connect or interlock mechanical components. FIGS. 1A and 1B show a first embodiment of a radially engaging system 10.

In this embodiment, the radially engaging system 10 includes a housing 12 defining a central throughbore 11 and a plurality of guide channels or grooves 14, 16, 18 formed therein, i.e. a first guide channel 14, a second guide channel 16, and a third guide channel 18. The housing 12 is substantially square in shape, but it is to be understood that the housing 12 can be provided with a variety of different shapes. Sliding members, i.e., a first sliding member 20, a second sliding member 22, and a third sliding member 24, are slidably disposed in corresponding guide channels 14, 16, 18. The guide channels 14, 16, 18 guide and confine sliding or reciprocating movement of the respective sliding members 20, 22, 24. In this embodiment, each sliding member 20, 22, 24 is constructed with a different cross-sectional shape. For example, the first sliding member 20 is provided as an elongate cylindrical post, the second sliding member 22 is provided as an elongate substantially square post, and the third sliding member 24 is constructed as an elongate hexagonal post.

A rotator 30 in the form of a rotating disk is operatively connected to each sliding member 20, 22, 24 to facilitate selective extension or retraction of the sliding members 20, 22, 24 with respect to the housing 12. Each sliding member 20, 22, 24 includes a respective follower extending orthogonally from near the bottom of the corresponding sliding member 20, 22, 24, i.e., a first follower 21 for the first sliding member 20, a second follower 23 for the second sliding member 22, and a third follower 25 for the third sliding member 24. Each follower 21, 23, 25 is preferably configured as a small cylindrical post fixed to the respective sliding member 20, 22, 24. Alternatively, each follower 21, 23, 25 can be configured as a small roller rotatably mounted to the corresponding sliding member 20, 22, 24.

The rotator 30 includes a plurality of guide curves 32, 34, 36 formed therein. Each guide curve 32, 34, 36 is configured to receive one of the followers 21, 23, 25 therein. Each guide curve 32, 34, 36 is formed in accordance with (has the curvature of) an Archimedean spiral. Upon rotation of the rotator 30, each guide curve 32, 34, 36 imparts a linear translation movement to the respective sliding member 20, 22, 24 connected thereto. The rotator 30 can include a socket or recess 31 for selective insertion of a tool in order to selectively rotate the rotator 30. Depending upon user preference and requirements, each of the guide curves 32, 34, 36 can be of the same shape except for their angular disposition around the axis of the rotator 30, which results in the sliding members 20, 22, 24 moving the same travel distance from one end of the curve to the other end. However, the Archimedian spiral permits a wide range of distances for a given rotational arc.

For example, in this embodiment, the first guide curve 32 and the second guide curve 34 are substantially the same shape and dimension. Thus, the corresponding first sliding member 20 and the second sliding member 22 both travel the same distance. In this embodiment, the given arc rotation is 70° and the first and second sliding members 20, 22 travel about 12 min as they are pushed or pulled by the rotation of the respective curve from one end of the curve to the other end. In contrast, the third guide curve 36 provides 8 mm of travel distance for the third sliding member 24, but only within a 50° rotation arc. The actual potential travel distance of the third sliding member 24 would be farther than 8 mm if the third guide curve 36 were formed so that the spiral shape thereof continued to extend the additional 20°. However, design constraints, such as the dimensions of the rotator 30 and the space provided thereby, or an intentional inclusion of a feature, can prohibit fully extending the third guide curve 36 through the full 70° degree arc. In order to maintain movement of all three sliding members 20, 22, 24 within the given arc rotation, the third guide curve 36 includes an auxiliary section 37. The auxiliary section 37 is preferably concentric with the diameter of the rotator 30 and forms an arc segment that extends the remainder of the given arc rotation, i.e., 20°. This auxiliary section 37 also performs a self-locking function by preventing movement of the third sliding member 24 unless the rotator has been rotated back to the beginning of the auxiliary section 37.

The radially engaging system 10 can be utilized in various different environments, such as for assembling components. Each sliding member 20, 22, 24 can be designated to a specific assembly part having a correspondingly shaped reception hole or bore and be connected thereby. This insures that there is no confusion with respect to placement and connection of various assembly parts. Another use includes locking functions where the different shapes of the sliding members 20, 22, 24 can be used to provide a proprietary or non-standard lock, which can help prevent undesirable tampering.

Figure 2:
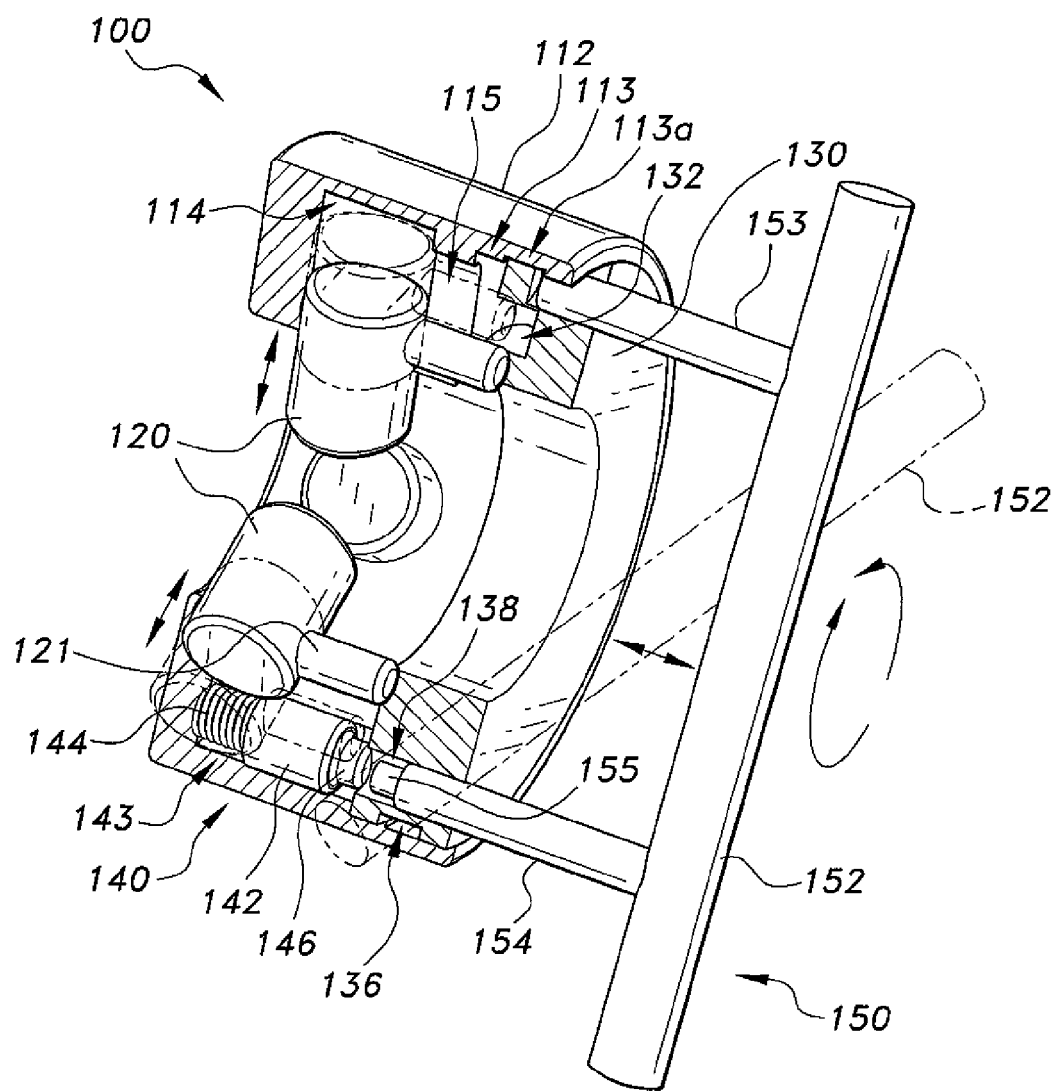
FIG. 2 is a perspective view of another embodiment of a radially engaging system according to the present invention, shown with parts broken away and in section to show details thereof.

Another embodiment of a radially engaging system is shown in FIG. 2. In this embodiment, the radially engaging system 100 includes a locking system incorporated therein to lock sliding members in either their extended or retracted positions.

As shown in the drawing, the radially engaging system 100 includes a substantially hollow, cylindrical housing 112 having a plurality of guide channels or bores 114 angularly spaced around the cylindrical housing 112. The guide channels 114 radially extend into the wall of the cylindrical housing 112 but not completely through the wall. A sliding member 120 is slidably received inside each guide channel 114, the guide channels 114 confining and defining the path or reciprocal movement of the sliding members 120. Each sliding member 120 includes an elongate follower 121 extending orthogonally from near the top of the respective sliding member 120. An elongate guide slot 115 is formed in the wall and communicates with a respective guide channel 114. Each guide slot 115 permits a respective follower 121 to pass through and ride therein. Each guide slot 115 is \preferably narrower in thickness compared to the length of the follower 121 to permit engagement of the follower 121 with a rotator 130.

One end of the housing 112 includes a recess 113 shaped and sized to receive the rotator 130. In this embodiment, the rotator 130 is constructed as an annular disc having at least one pair of keyholes 138 extending axially through the thickness of the rotator 130. One side of the rotator 130 is provided with a plurality of guide curves or grooves 132 configured to operatively receive one of the followers 121 in each guide groove 132. The rotator 130 can also include an annular groove 136 around the outer circumference thereof for placement of a clutch ring (not shown) to secure the mounting of the rotator 130 onto the housing 112. An example of such a clutch ring 237 is shown FIG. 3E in another embodiment.

The radially engaging system 100 also includes a locking mechanism 140 for selectively locking the rotator 130 in positions in which the corresponding sliding members 120 are either fully retracted or extended. The locking mechanism 140 includes an elongate lock post 142 biased into an extended, locked position by a spring 144. Both the lock post 142 and the spring 144 are disposed within a lock recess 143 near the other end of the housing 112. The top or upper end of the lock post 142 can include an engagement head 146, which serves as a component for interaction with a key 150, and as an abutment preventing relative rotation of the rotator 130 in the normal, extended and locked position. The lock post 142 is preferably larger in diameter than the diameter of the keyhole 138. The diameter of the engagement member 146 is preferably small enough to fit inside the keyhole 138. By this construction, the locking post 142 axially abuts the side of the rotator 130 in the normal locked position, while the engagement head 146 resides inside the keyhole 138, effectively locking the rotator 130 in position.

In order to operate the locking mechanism 140, the radially engaging system 100 includes the key 150. The key 150 can be a wrench having an elongate handle 152 and a pair of elongate posts or key members 153, 154 extending orthogonally therefrom, i.e., a first key member 153 and a second key member 154. Each key member 153, 154 is configured to fit through the keyhole 138. At least one of the key members 153, 154 is constructed to interact with the locking post 142. In this embodiment, the second key member 154 can include an engagement head 155 at the distal end thereof, which effectively results in the second key member 154 being longer than the first key member 153. Alternatively, the key member 154 can be constructed to be longer than the key member 153 without an engagement head 155. In use, the user inserts the key 150 into the keyholes 138, and the second key member 154 presses against the bias of the engagement head 146 via the engagement head 155 until the engagement member 146 is free from the keyhole 138. At this point, the user can turn the key 150, thereby rotating the rotator 130. In this embodiment, the locking mechanism 140 automatically engages the keyhole 138 via the spring 144 when the rotator 130 has been rotated to the fully retracted position of the sliding members 120, i.e., retracted with respect to the axis of the housing 112.

Like the previous radially engaging system 10, the radially engaging system 100 facilitates a variety of uses. For example, the radially engaging system 100 can be used to clamp onto a mechanical component inserted through the housing 112. The clamping occurs when the sliding members 120 are retracted towards the axis of the housing 112. In another example, separate mechanical components having corresponding holes dimensioned and configured to fit the sliding members 120 can be selectively connected together by the same type of action.

Another embodiment of a radially engaging system 200 is shown in FIGS. 3A-3D. In this embodiment, the radially engaging system 200 facilitates inner and outer connection or locking of mechanical components.

As best seen in FIGS. 3A and 3B, the radially engaging system 200 includes a substantially hollow, cylindrical housing 212 having at least two pairs of guide channels or bores 214, 216 angularly spaced around the cylindrical housing 212. A pair of first guide channels 214 is disposed at diametrically opposed positions on the housing 212. A pair of second guide channels 216 is also disposed at diametrically opposed positions on the housing 212 orthogonal to the first guide channels 214. The guide channels 214, 216 radially extend through the wall of the cylindrical housing 212. A first sliding member 220 is slidably received inside each first guide channel 214, and a second sliding member 222 is slidably received inside each of the second guide channels 216. The guide channels 214, 216 confine and define the path or reciprocable movement of the sliding members 220, 222. Each sliding member 320 includes an elongate follower 221 extending orthogonally from near the top of the respective first sliding member 220, and each second sliding member 222 includes an elongate follower 223 extending orthogonally from near the bottom of the respective sliding member 222.

Figure 3E:
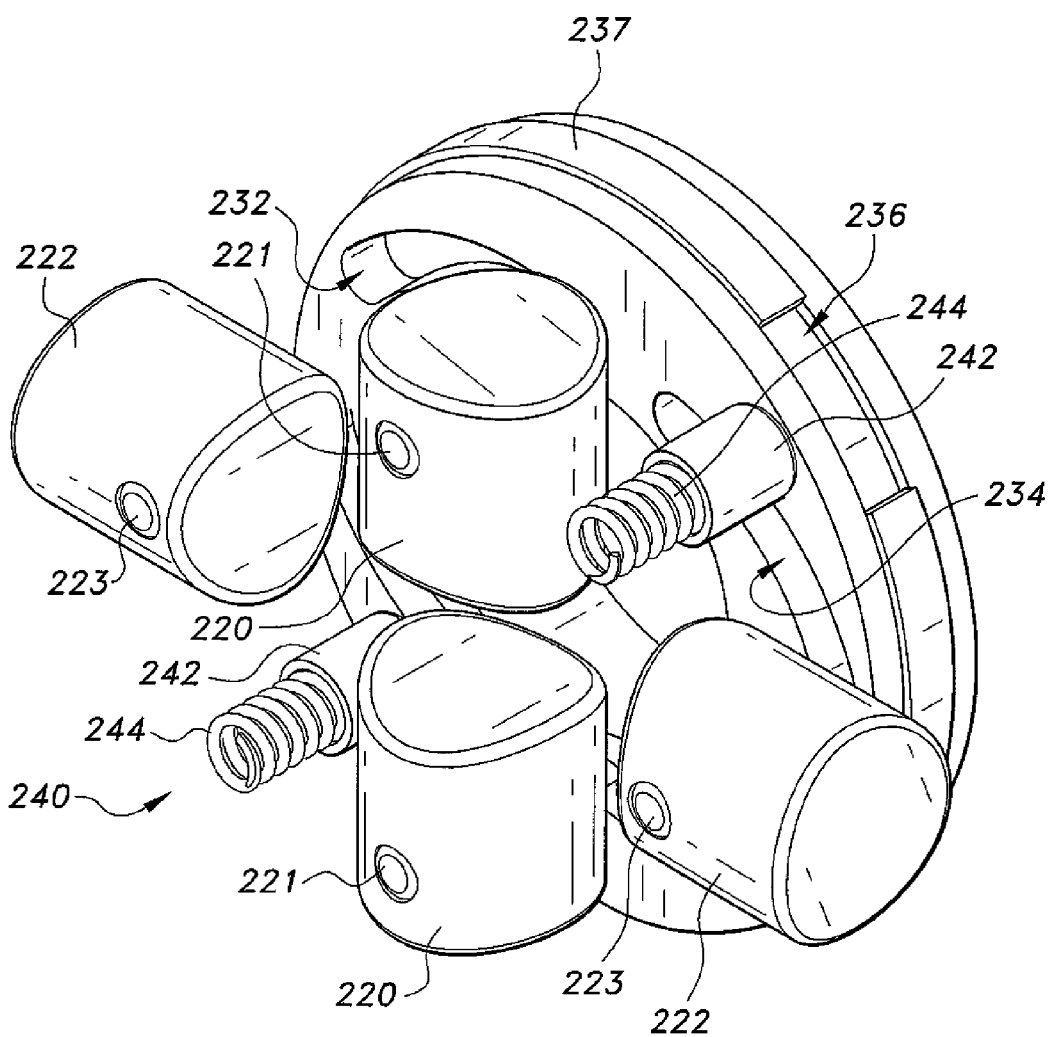
FIG. 3E is a perspective view of the inner components for actuating the sliding members in the radially engaging system of FIG. 3A, shown with the housings removed.

One end of the housing 212 includes a recess (not shown but substantially the same as the recess 113 in the previous embodiment) dimensioned and configured to receive a rotator 230. In this embodiment, the rotator 230 is constructed as an annular disc having at least one pair of keyholes 238 extending through the thickness of the rotator 230. As best seen in FIG. 3E, one face of the rotator 230 is provided with at least two pairs of guide curves or grooves 232, 234. A pair of first guide grooves 232 is configured to operatively receive the followers 221 of the first sliding members 220. Similarly, a pair of second guide grooves 234 is configured to operatively receive the followers 223 of the second sliding members 222. The rotator 230 also includes an annular groove 236 around the outer surface thereof for placement of a clutch ring 237 to secure the mounting of the rotator 230 onto the housing 212.

For a given rotational arc of the rotator 230, each first guide groove 232 facilitates selective retraction and extension of the respective sliding members 220 in order to engage and lock a component inside the housing 212. In this instance, the component is an elongate shaft or rod 270 having a throughbore 272 extending perpendicularly therethrough and aligned in communication with the first guide channels 214 when assembled. Each first guide groove 232 spirals in the same polar coordinate direction, except the grooves 232 are disposed 180° apart.

Conversely, for a given rotational arc of the rotator 230, each second guide groove 234 facilitates selective extension and retraction of the respective sliding members 222 in order to engage and lock a component outside the housing 212. In this instance, the component is an outer hollow cylindrical housing 260 having a central opening 263 for selective insertion of the housing 212. A pair of diametrically opposed throughbores 262 is formed on the outer housing 260 and aligned in communication with the second guide channels 216 when assembled. Each second guide groove 234 spirals in the same polar coordinate direction, except the grooves 234 are disposed 180° apart. Moreover, the direction of spiral is opposite that of the first guide grooves 232. In this embodiment, each sliding member 220, 222 is preferably provided with curved ends to better conform with the circular shapes of the shaft 270 and the outer housing 260.

The radially engaging system 200 can also include a locking mechanism 240. In this embodiment, the locking mechanism includes a pair of elongate lock posts 242 biased into an extended, locked position by a respective spring 244, the lock posts 242 being the same construction as the previously described lock posts 142. The locking mechanism 240 operates in substantially the same manner as the locking mechanism 140 and utilizes a similar key (not shown) as the previously described key 150, except that the key would include an engagement head on both key members or be of equal length.

In use, selective rotation of the rotator 230 by a predetermined rotation arc in one direction by a key causes the first sliding members 220 to retract into the throughbore 272 on the shaft 270. At the same time, the second sliding members 222 extend into the throughbores 262 on the outer housing 260. Rotation of the rotator 230 in the opposite direction reverses the above process. The locking mechanism 240 can be constructed to lock the rotator 230 in either or both rotated positions. Thus, the radially engaging system 200 facilitates simultaneous connection or locking of inner and outer mechanical components. It is to be recognized that while the above has been described with reference to various pairs of sliding members 220, 222 and their corresponding guide curves or groove 232, 234, any of the embodiments described herein can utilize any number of sliding members and guide curves at various positions within and about the housing to facilitate the selective retraction and extension, depending on the particular interlocking connection desired.

Figure 4A:
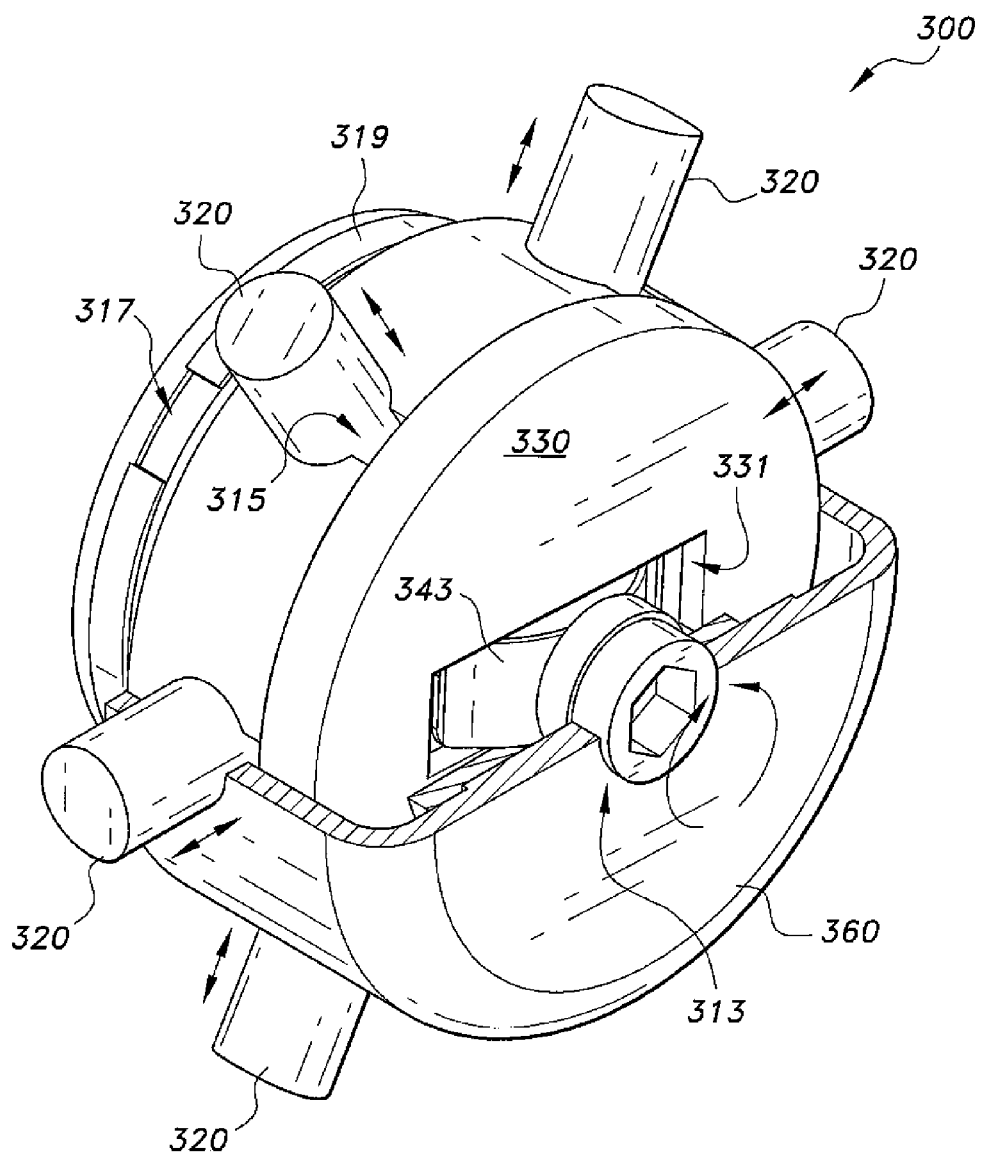
FIG. 4A is a perspective view of yet another embodiment of a radially engaging system according to the present invention, shown with the housing broken away and partly in section.
Figure 4B:
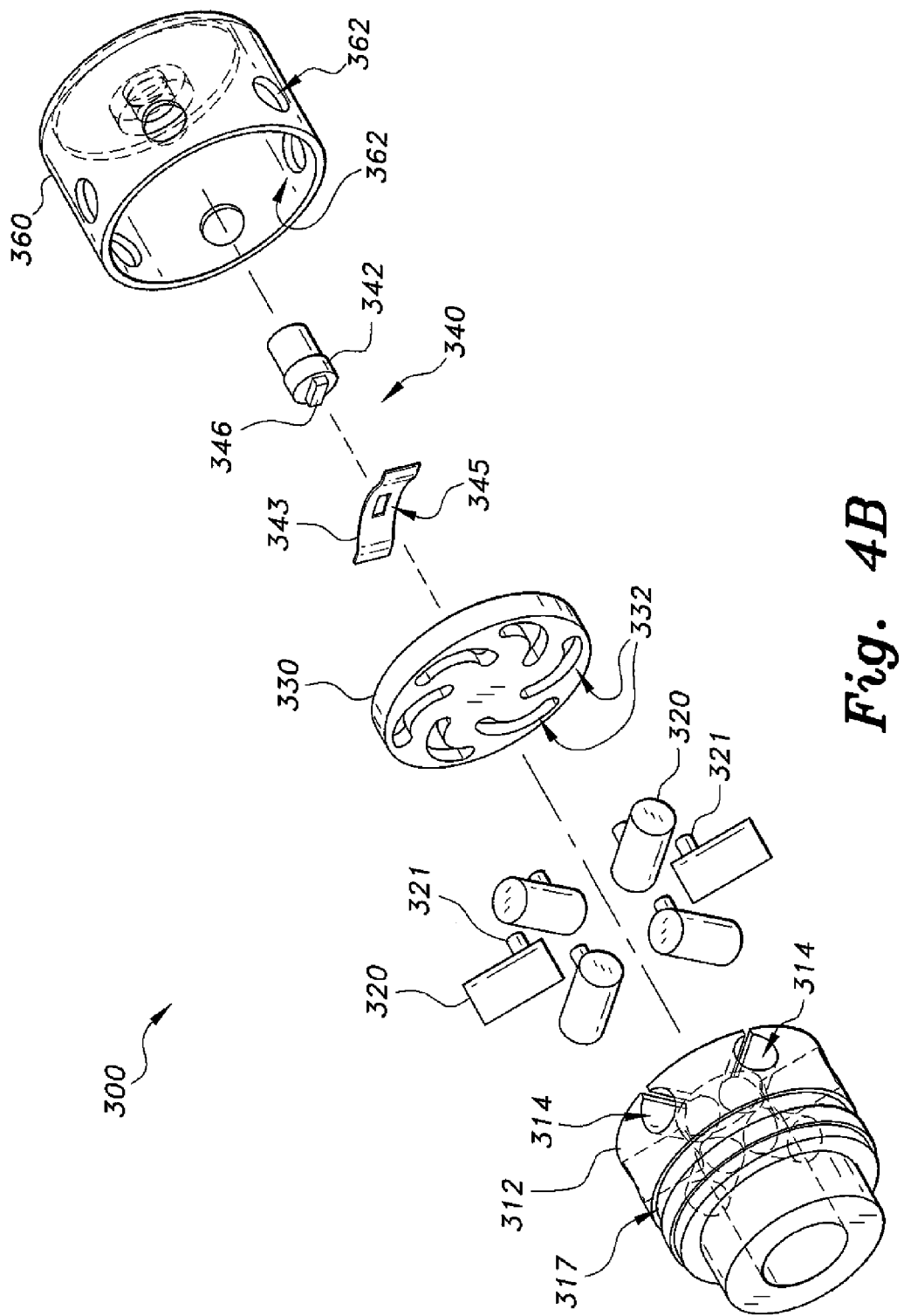
FIG. 4B is an exploded perspective view of the radially engaging system of FIG. 4A.
Figure 4C:
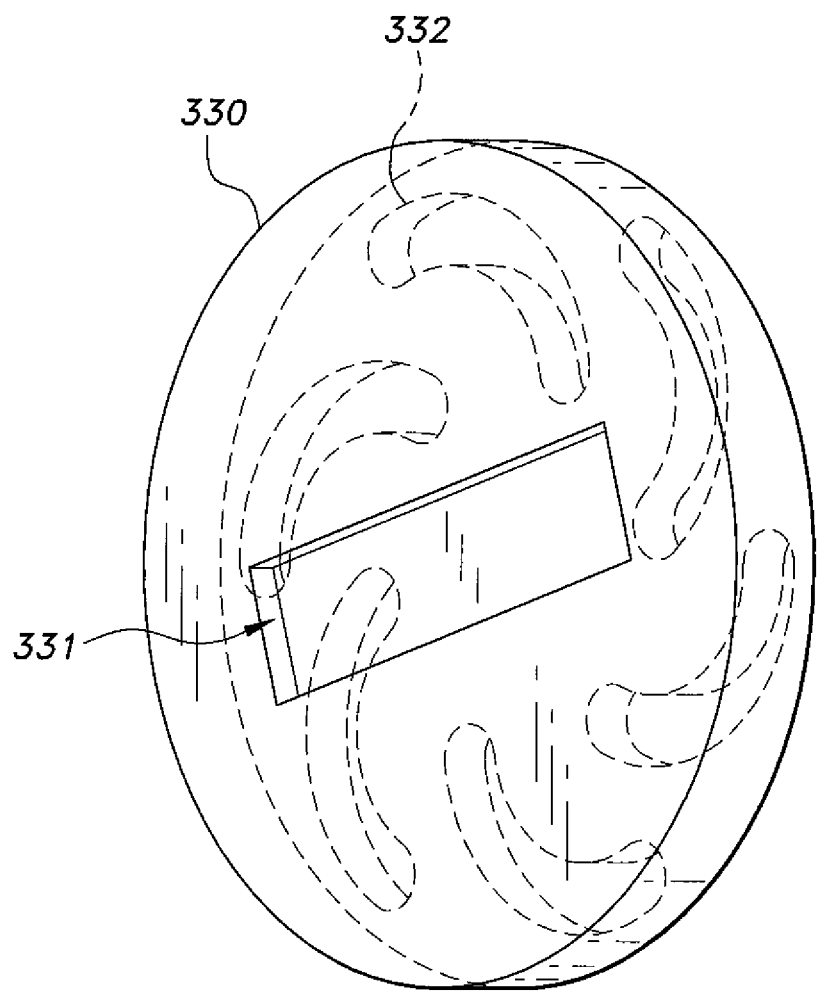
FIG. 4C is a perspective view of the rotator for the radially engaging system of FIG. 4A.

Yet another embodiment of a radially engaging system is shown in FIGS. 4A-4C. In this embodiment, the radially engaging system 300 can be used to lock joints and the like at select positions and includes an alternative locking mechanism.

As best seen in FIGS. 4A and 4B, the radially engaging system 300 includes a substantially hollow, cylindrical housing 312 having a plurality of guide channels or bores 314 angularly spaced around the cylindrical housing 312. The guide channels 314 radially extend through the wall of the cylindrical housing 312. A sliding member 320 is slidably received inside each guide channel 314, the guide channels 314 confining and defining the path or reciprocable movement of the sliding members 320. Each sliding member 320 includes an elongate follower 321 extending orthogonally from near the bottom of the respective sliding member 320. An elongate guide slot 315 is formed in the wall and communicates with a respective guide channel 314. Each guide slot 315 permits a respective follower 321 to pass through and ride therein. In this embodiment, the radially engaging system 300 is provided with six sliding members 320, which provide a plurality of points of locking engagement.

One end of the housing 312 includes an annular groove 317 for receiving a clutch ring 319 thereon. The above permits selective and secure mounting of the radially engaging system 300 into a correspondingly shaped recess or receptacle. A circular rotator 330 is disposed on the opposite end of the housing 312. One side of the rotator 330 is provided with a plurality of guide curves or grooves 332 configured to operatively receive one of the followers 321 in each guide groove 332.

The radially engaging system 300 is also provided with an outer housing, casing or cap 360 constructed to enclose and cover the housing 312 and the rotator 330. The outer housing 360 includes a central bore 363 for receiving a component of the locking mechanism to be described herein. A plurality of outer bores or holes 362 are formed around the circumferential wall of the outer housing 360. The outer bores 362 are equal in number to the number of sliding members 320. When assembled, the sliding members 320 extend into the respective outer bores 362 to secure the outer housing 360.

In order to selectively rotate the rotator 330 and lock the relative position thereof, the radially engaging system 330 also includes a locking mechanism 340. The locking mechanism 340 includes an elongate lock post 342 mounted to the central bore 363. A socket 347 is formed on one end of the lock post 342, and an engagement head 346 is formed on the opposite end. The socket 347 is configured to selectively receive a tool or key, such as a hex wrench. As best seen in FIGS. 4A and 4C, an elongate groove 331 is formed on the opposite face of the rotator 330. The elongate groove 331 is configured to receive a leaf spring 343. The leaf spring 343 includes an elongate engagement slot 345 dimensioned and configured to receive the engagement head 346. In this embodiment, both the engagement head 346 and the engagement slot 345 are rectangular in shape.

In use, the leaf spring 343 is normally uncompressed, and the engagement head 346 is received in the engagement slot 345, which effectively locks the rotator 330 in position. In order to rotate the rotator 330, the user uses a tool or key via the socket 347 to rotate the locking post 342 inwards, compressing or flattening the leaf spring 343 within the elongate groove 331. Once flattened to a point, continuous turning of the locking post 342 drives rotation of the rotator 330 in order to extend or retract the sliding members 320. Reversal of the above process facilitates the opposite.

Figure 5:
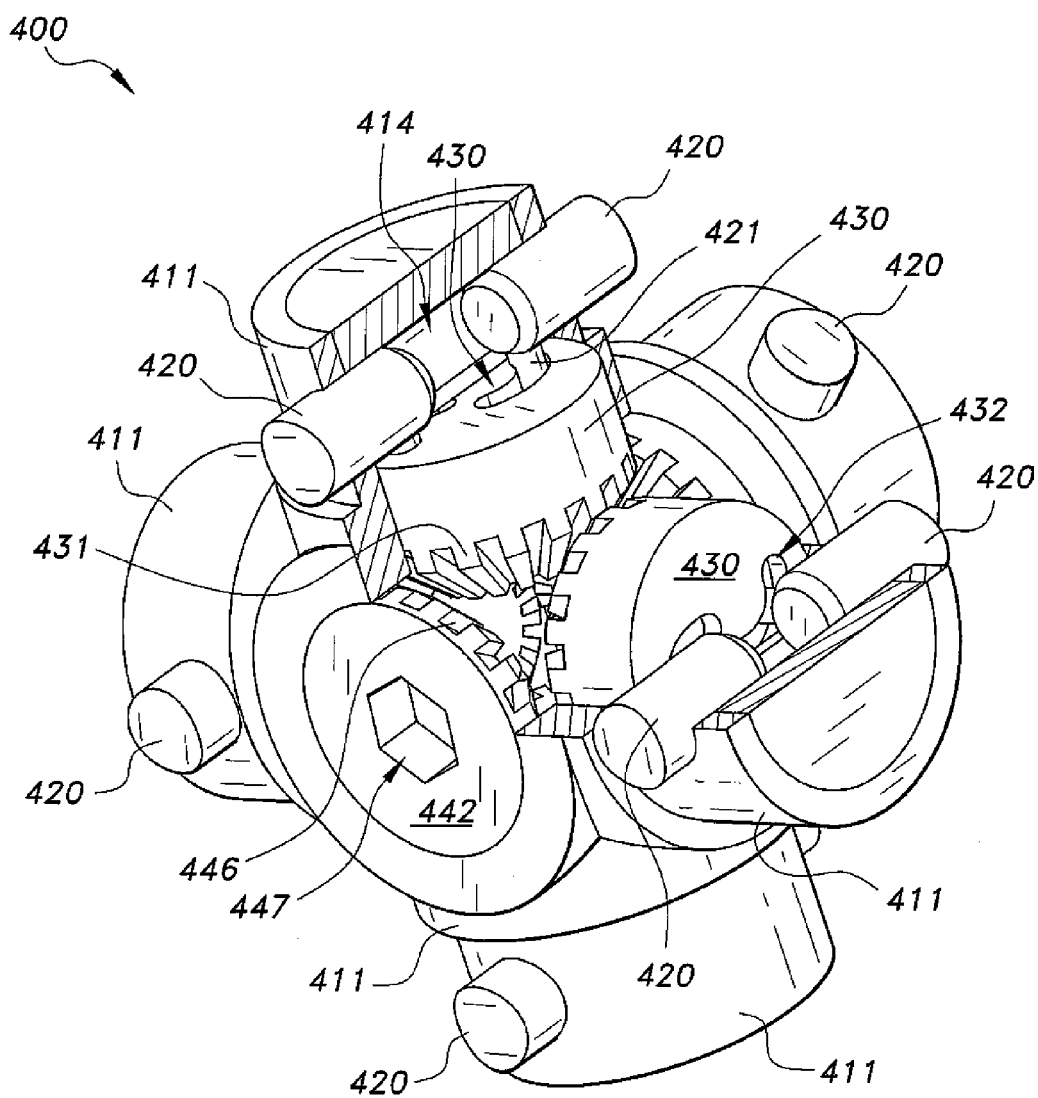
FIG. 5 is a perspective view of a yet another embodiment of a radially engaging system according to the present invention, shown with components broken away and partly in section.

Yet another embodiment of a radially engaging system is shown in FIG. 5. In this embodiment, the radially engaging system 400 can be used to simultaneously connect or lock mechanical components in multiple positions.

As shown in the drawing, the radially engaging system 400 includes a substantially hollow housing 412 having a plurality of sub-housings 411 radiating therefrom. In this embodiment, four of the sub-housings extend radially in orthogonal directions, while the last sub-housing extends from the back of the housing 412. Each sub-housing 411 is preferably shaped as a hollow cylindrical post and includes a guide channel 414 extending orthogonally through the sub-housing 411. A pair of sliding members 420 is slidably received inside each guide channel 414, the guide channels 414 confining and defining the path or reciprocable movement of the sliding members 420. Each sliding member 420 includes an elongate follower 421 extending orthogonally from near the bottom of the respective sliding member 420.

A circular rotator 430 is disposed inside each sub-housing 411. One side of the rotator 430 is provided with a plurality of guide curves or grooves 432 configured to operatively receive one of the followers 421 in each guide groove 432. The opposite side of the rotator 430 is provided with an integrated bevel gear 431. When assembled, all five of the rotators 430 are meshed together via the respective bevel gears 431.

In order to rotate the rotators 430 simultaneously, the radially engaging system 400 includes an actuator 442 mounted to the front of the housing 412. In this embodiment, the actuator 442 is constructed as a frustoconical member having a socket 447 to selectively receive a key or tool on one side and an integrated bevel gear 446 on the opposite side. The bevel gear 446 meshes with adjacent bevel gears 531.

In operation, the user inserts a key or tool, such as a hex wrench, into the socket 447 and rotates the actuator 442 in a selected direction. Rotation of the actuator 442 simultaneously rotates all the rotators 430 due to the intermeshing of all the bevel gears 431, 446. Consequently, all the sliding members 420 extend or retract, depending on the rotation direction of the actuator 442.

Figure 6:
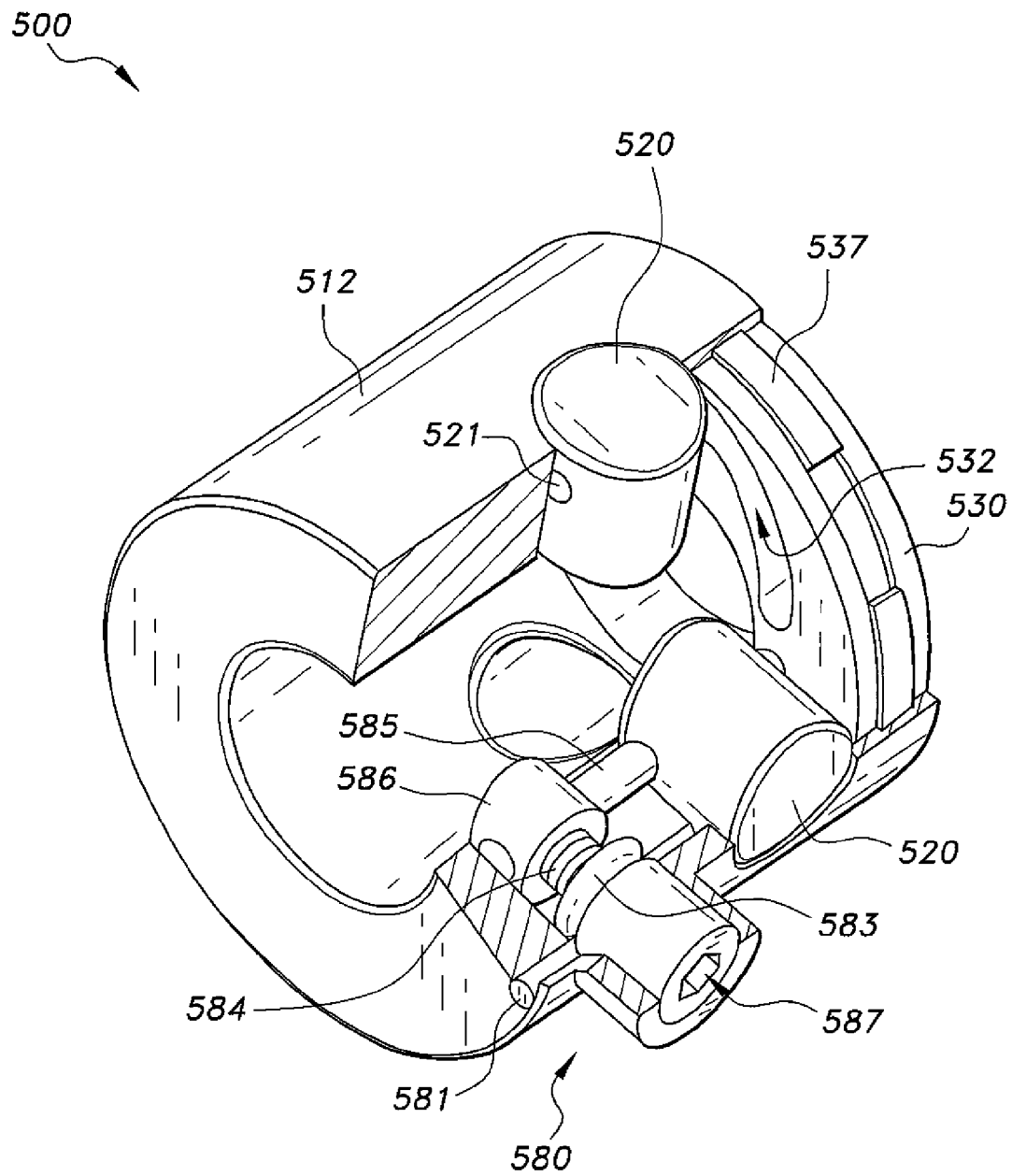
FIG. 6 is perspective view of yet another embodiment of a radially engaging system according to the present invention, shown with components broken away and partly in section.
Figure 7:
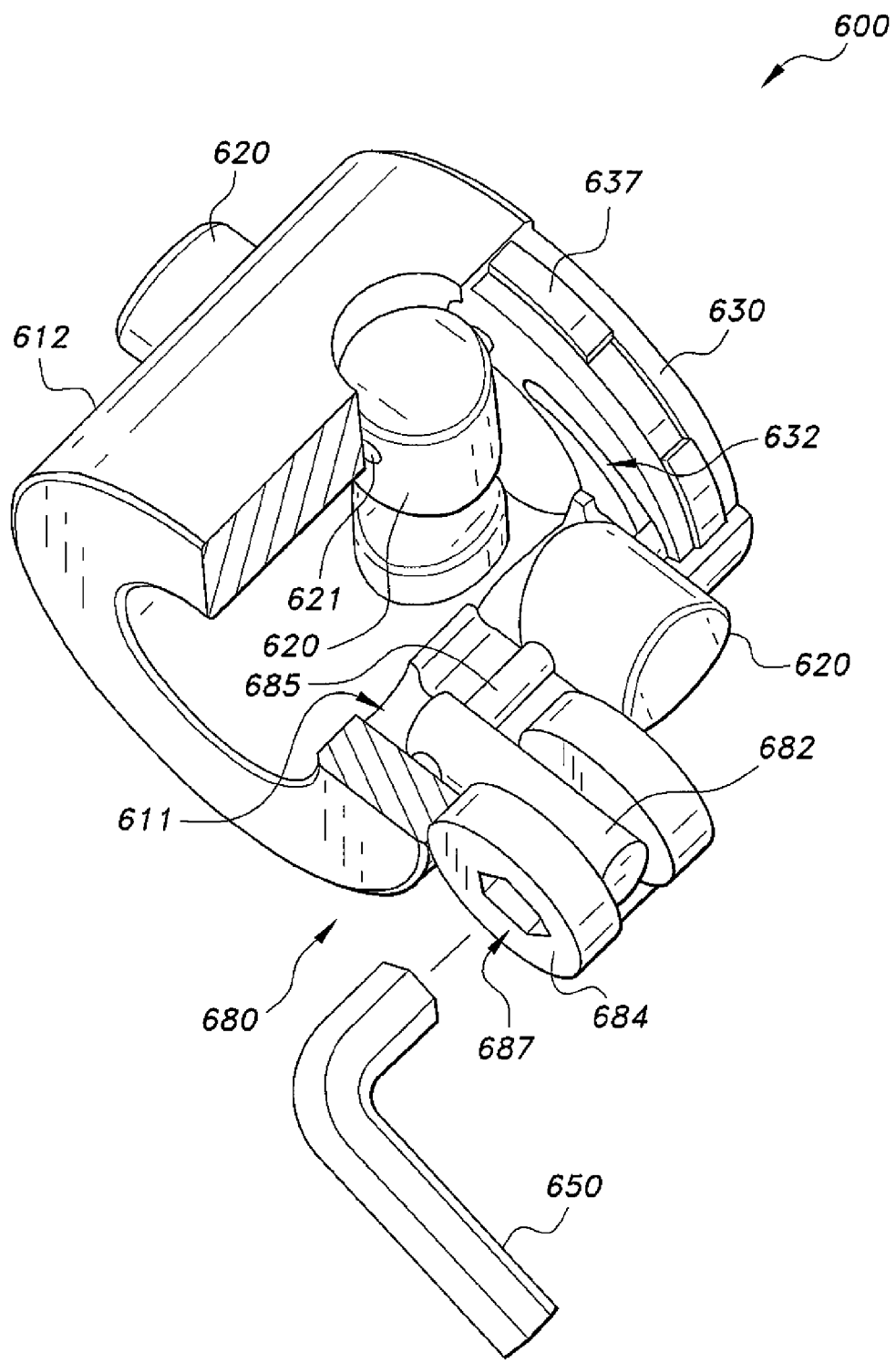
FIG. 7 is a perspective view of a further embodiment of a radially engaging system according to the present invention, shown with components broken away and partly in section.

Yet further embodiments of radially engaging system are disclosed in FIGS. 6 and 7. In these embodiments, radial movement of sliding members is not facilitated by positive rotation of a rotator. Instead, the radial movement is facilitated by positive actuation of at least one of the sliding members, i.e., a conversion of linear motion to rotary motion.

As best seen in FIG. 6, the radially engaging system 500 is substantially the same in construction as many of the previously described embodiments. The radially engaging system 500 includes a substantially hollow, cylindrical housing 512, a plurality of guide channels or bores 514, a plurality of sliding members 520 slidably received inside each guide channel 514, an elongate follower 521 on all except at least one of the sliding members 520, an annular rotator 530, a plurality of guide curves 532 and a clutch ring 537 for securely mounting the rotator 530 to the housing 512.

In this embodiment, the radially engaging system 500 includes a linear actuator 580. The linear actuator 580 includes a drive post, shaft or rod 582 rotatably mounted inside a boss 511 extending radially from a side of the housing 512. A socket 587 is formed on one end of the drive shaft 582 to selectively receive a tool or key. The opposite end includes an annular stabilizing groove 583, which interacts with a stabilizing pin 581 inserted through one end of the housing 512. The stabilizing pin 581 rides inside the stabilizing groove 583 and prevents axial movement of the drive shaft 582 with respect to the boss 511 during operation; thus stabilizing and maintaining relative position of the drive shaft 582.

An elongate threaded bolt 584 extends axially from the drive shaft 582 and engages a connecting member 586 via the threads thereon. The connecting member 586, in turn, is connected to an elongate drive follower 585 extending through one of the sliding members 520 and into a respective guide curve 532, the drive follower 585 being disposed orthogonal to the threaded bolt 584.

In operation, instead of rotating the rotator 530, the user rotates the drive shaft 582 with a key or tool inserted in the socket 587. Rotation of the drive shaft 682 rotates the threaded bolt 584, which pushes or pulls the connecting member 586, depending on the direction of rotation. Pushing or pulling of the connecting member 586 forces the connected sliding member 520 to retract or extend, respectively. Due to the drive follower 585 connection to one of the guide curves 532, the linear movement of the drive follower 585 forces the rotator 530 to rotate, thereby facilitating concurrent extension and retraction of the remaining sliding members 520. In this embodiment, the guide curve 532 is driven by the drive follower 585. The Archimedian spiral principal in constructing the guide curve 532 provides a guide curve wherein the transition from linear to rotary motion can be accomplished with minimal effort due to the curve being smooth and constant. Such a constant curve results in the same magnitude of force being exerted throughout the predefined rotational arc, i.e., whatever force is required to linearly move the drive follower 585 along the guide curve 532 would be the same at any point on the curve.

As best seen in FIG. 7, the radially engaging system 600 is substantially the same in construction as the radially engaging system 500. In that regard, the radially engaging system 600 includes a substantially hollow, cylindrical housing 612, a plurality of guide channels or bores 614, a plurality of sliding members 620 slidably received inside each guide channel 614, an elongate follower 621 on all except at least one of the sliding members 620, an annular rotator 630, a plurality of guide curves 632 and a clutch ring 637 for securely mounting the rotator 630 to the housing 612.

In this embodiment, the radially engaging member 600 includes a linear actuator 680. The linear actuator 680 includes a drive post, shaft or rod 682 rotatably mounted to an eccentric cam 684 at one end. The eccentric cam 684 is disposed on a side of the housing 612, and the drive rod 682 extends radially into the housing 612 through a side bore 611. The eccentric cam 684 is constructed as cylindrical bracket straddling the connected end of the drive rod 682. The pivot or rotational axis for the drive rod 682 is offset from the axis of the cylindrical bracket. A socket 687 is formed on one end of the eccentric cam 684 to selectively receive a tool or key 650. In this instance, the tool 650 can be a hex wrench. The other end of the drive rod 682 is connected to an elongate drive follower 685 extending through one of the sliding members 620 and into a respective guide curve 632, the drive follower 685 being disposed orthogonal to the threaded drive rod 682.

In operation, instead of rotating the rotator 630, the user rotates the eccentric cam 684 with the tool 650. Rotation of the eccentric cam 684 linearly pushes or pulls the drive rod 682, depending on the direction of rotation. The drive rod 682 is confined to reciprocate within the side bore 611. Pushing or pulling of the connecting member drive rod 682 forces the connected sliding member 620 to retract or extend, respectively. Due to the drive follower 685 connection to one of the guide curves 632, the linear movement of the drive follower 685 forces the rotator 630 to rotate, thereby facilitating concurrent extension and retraction of the remaining sliding members 620. Thus, the function and operation of the radially engaging system 600 is substantially the same as that of the radially engaging system 600, except that the driver is an eccentric cam instead of a screw-type driver.

In all the embodiments described above, the radially engaging systems 10, 100, 300, 300, 400, 500, 600 incorporate a rotator having at least one guide curve based upon an Archimedian spiral, a sliding member and follower slidably connected to the guide curve, and a guide channel for confined reciprocal movement of the sliding member. The principals of the Archimedian spiral permit relatively smooth extension and retraction of the sliding members, due in part to the numerous user-defined guide curve configurations where the relative angular disposition of the guide curve, i.e., the general direction that the guide curve extends with respect to the axis of rotation, can be steep or shallow, yet positioned so that the effort required to move the sliding members, either through rotation to linear translation or vice versa, is kept to a desirable minimum.

It is to be noted that the radially engaging system 10, 100, 200, 300, 400, 500, 600 encompasses a wide variety of alternatives. For example, any of the above systems can be constructed from various materials, such as wood, plastic, steel, composites, and combinations thereof. Some or all of the components of the radially engaging system can be provided with differentiating colors and/or indicia. The descriptions of the use of the various embodiments should not be construed as being limited thereto. The engaging system 10, 100, 200, 300, 400, 500, 600 can be used in any situation requiring selective locked connection of mechanical components. Additionally, the number of sliding members and their orientation, the particular configuration and orientation of the guide curves, and the shape of the sliding members and the corresponding guide channels can be varied according to the desires and requirements of the user.

It is to be understood that the present invention is not limited to the embodiments described above, but encompasses any and all embodiments within the scope of the following claims.

We claim:

1. A radially engaging system, comprising:
a housing having at least one guide channel formed therein;
at least one sliding member slidably disposed in a respective guide channel to reciprocate therein;
a follower extending orthogonally from each sliding member;
at least one rotator rotatably connected to the housing, the at least one rotator having at least one guide curve formed therein, the at least one guide curve being configured as an Archimedian spiral, the follower being received in the at least one guide curve and extending away from an axis of rotation of the rotator, the at least one guide curve defining a predefined travel distance for the at least one sliding member; and
a rotating mechanism for selectively rotating the rotator to selectively extend or retract the at least one sliding member into and out of locking engagement with at least one mechanical component;
wherein a rate of linear movement of the at least one sliding member is proportionately constant with a rate of rotation of the rotator;
wherein the housing comprises an elongate, substantially hollow cylindrical housing;
wherein the at least one sliding member comprises a plurality of sliding members spaced around the cylindrical housing;
wherein the cylindrical housing comprises a plurality of sub-housings radially extending in different directions;
each sub-housing consists of:
one of the at least one guide channel extending orthogonally through the sub-housing;
a pair of sliding members slidably received in the at least one guide channel;
the at least one rotator disposed in the sub-housing, the at least one rotator having a pair of guide curves formed on one side to receive the followers of the pair of sliding members; and
an integral bevel gear formed on the other side of the one of the at least one rotator, the bevel gear meshing with bevel gears of adjacent rotators.

2. The radially engaging system according to claim 1, wherein the rotating mechanism comprises an actuator mounted to the cylindrical housing, the actuator having a socket at one end adapted to selectively receive a tool and rotate the same, and an integral bevel gear formed on the other side of the actuator, the actuator bevel gear meshing with adjacent rotator bevel gears to simultaneously rotate all of the rotators upon selective rotation thereof.

3. A radially engaging system, comprising:
a housing having at least one guide channel formed therein;
at least one sliding member slidably disposed in a respective guide channel to reciprocate therein;
a follower extending orthogonally from each sliding member;
at least one rotator rotatable connected to the housing, the at least one rotator having at least one guide curve formed therein, the at least one guide curve being configured as an Archimedian spiral, the follower being received in the at least one guide curve and extending away from an axis of rotation of the rotator, the at least one guide curve defining a predefined travel distance for the at least one sliding member; and
a rotating mechanism for selectively rotating the rotator to selectively extend or retract the at least one sliding member into and out of locking engagement with at least one mechanical component;
wherein a rate of linear movement of the at least one sliding member is proportionately constant with a rate of rotation of the rotator;
wherein the housing includes an elongate, substantially hollow cylindrical housing;
wherein the at least one sliding member includes a plurality of sliding members spaced around the cylindrical housing;
wherein the rotating mechanism includes a linear actuator operatively connected to the at least one sliding member;
wherein the linear actuator consists of:
a hollow boss radially extending from the cylindrical housing;
a drive shaft rotatably mounted inside the hollow boss, the drive shaft having a socket at one end to selectively receive a tool to rotate the drive shaft, the drive shaft having an annular stabilizing groove formed near an opposite end;
a stabilizing pin riding inside the annular stabilizing groove, the stabilizing pin preventing axial movement of the drive shaft;
an elongate threaded bolt extending axially from the opposite end of the drive shaft;
a connecting member receiving the threaded bolt; and
an elongate drive follower extending from the connecting member through the at least one sliding member into a corresponding guide curve, the drive follower extending orthogonal to the drive shaft;
wherein selective rotation of the drive shaft linearly pushes or pulls the at least one sliding member attached to the drive follower, and linear movement of the drive follower inside the guide curve forces corresponding rotation of the at least one rotator as the drive follower travels along the guide curve.

4. A radially engaging system, comprising:
a housing having at least one guide channel formed therein;
at least one sliding member slidably disposed in a respective guide channel to reciprocate therein;
a follower extending orthogonally from each sliding member;
at least one rotator rotatably connected to the housing, the at least one rotator having at least one guide curve formed therein, the at least one guide curve being configured as an Archimedian spiral, the follower being received in the at least one guide curve and extending away from an axis of rotation of the rotator, the at least one guide curve defining a predefined travel distance for the at least one sliding member; and
a rotating mechanism for selectively rotating the rotator to selectively extend or retract the at least one sliding member into and out of locking engagement with at least one mechanical component;
wherein a rate of linear movement of the at least one sliding member is proportionately constant with a rate of rotation of the rotator;
wherein the housing includes an elongate, substantially hollow cylindrical housing;
wherein the at least one sliding member includes a plurality of sliding members spaced around the cylindrical housing;
wherein the rotating mechanism includes a linear actuator operatively connected to the at least one sliding member;
wherein the linear actuator consists of:

an eccentric cam disposed outside the cylindrical housing, the eccentric cam having a socket at one side to selectively receive a tool to rotate the eccentric cam;
a drive rod extending radially into the cylindrical housing, one end of the drive rod being pivotally mounted to the eccentric cam; and
an elongate drive follower extending from the opposite end of the drive rod, the drive follower being orthogonal to the drive rod and extending through the at least one sliding member into a corresponding guide curve;
wherein selective rotation of the drive rod linearly pushes or pulls the at least one sliding member attached to the drive follower, linear movement of the drive follower inside the guide curve forcing corresponding rotation of the at least one rotator as the drive follower travels along the guide curve.

* * * * *